(12) United States Patent
Ogino et al.

(10) Patent No.: US 7,110,775 B2
(45) Date of Patent: Sep. 19, 2006

(54) POSITION CALCULATION METHOD AND A MOBILE TERMINAL AND A SERVER THEREFOR

(75) Inventors: Atsushi Ogino, Kodaira (JP); Kenzaburo Fujishima, Kokubunji (JP); Hideya Suzuki, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 10/340,748

(22) Filed: Jan. 13, 2003

(65) Prior Publication Data

US 2004/0203913 A1    Oct. 14, 2004

(30) Foreign Application Priority Data

Jul. 11, 2002    (JP)    ............................. 2002-202055

(51) Int. Cl.
*H04Q 7/20* (2006.01)
*G01C 21/26* (2006.01)
*G01S 3/02* (2006.01)

(52) U.S. Cl. .............................. 455/456.1; 455/456.3; 455/525; 701/214; 342/450

(58) Field of Classification Search .. 455/456.1–456.6, 455/404.2, 422.1, 457, 525, 524, 67.16, 426.1; 701/213, 214; 342/450
See application file for complete search history.

(56) References Cited

U.S. PATENT DOCUMENTS

| | | | |
|---|---|---|---|
| 6,282,427 B1 * | 8/2001 | Larsson et al. .......... | 455/456.2 |
| 6,353,412 B1 | 3/2002 | Soliman | |
| 6,389,291 B1 * | 5/2002 | Pande et al. ............. | 455/456.5 |
| 6,484,034 B1 | 11/2002 | Tsunehara et al. | |
| 6,496,701 B1 * | 12/2002 | Chen et al. .............. | 455/456.5 |
| 6,640,107 B1 * | 10/2003 | Kuwahara et al. ........ | 455/456.6 |
| 6,694,142 B1 * | 2/2004 | Kuwahara et al. ........ | 455/456.1 |
| 6,912,395 B1 * | 6/2005 | Benes et al. ............. | 455/456.1 |
| 2001/0053698 A1 * | 12/2001 | Karmi et al. ............... | 455/456 |
| 2002/0025822 A1 * | 2/2002 | Hunzinger .................. | 455/456 |
| 2003/0125045 A1 * | 7/2003 | Riley et al. ................. | 455/456 |

FOREIGN PATENT DOCUMENTS

| | | |
|---|---|---|
| JP | 7-181242 | 12/1993 |
| JP | 9-247737 | 3/1996 |
| JP | 2001-166026 | 12/1999 |
| WO | WO 10/05184 A1 | 1/2001 |

OTHER PUBLICATIONS

U.S. Appl. No. 09/791,862, filed Feb. 26, 2001, Kuwahara et al.
U.S. Appl. No.10/038,677, filed Jan. 8, 2002, Watanabe et al.
U.S. Appl. No. 10/180,492, filed Jun. 27, 2002, Tsunehara et al.

* cited by examiner

*Primary Examiner*—Duc M. Nguyen
(74) *Attorney, Agent, or Firm*—Reed Smith LLP; Stanley P. Fisher, Esq.; Juan Carlos A. Marquez, Esq.

(57) ABSTRACT

In calculation of a position of a terminal, there arises, when creating a delay profile, a problem to select a transmission code for a sector of a base station to create the delay profile. According to a position of a base station and a bearing of each antenna forming a sector of the base station, a wireless position calculation method selects a transmission code for a sector of a base station to create a delay profile. Under a condition that the number of delay profiles to be created is limited, each delay profile is created in consideration of the antenna bearing. Therefore, the number of base stations at mutually different positions is increased to calculate the position and precision of the position calculation is improved.

8 Claims, 17 Drawing Sheets

FIG. 6

| IDENTIFICATION No. | ANTENNA LOCATION | | ANTENNA BEARING (°) | IDENTIFICATION No. OF TRANSMITTING CODE |
|---|---|---|---|---|
| | X(m) | Y(m) | | |
| 0101 | 211 | 2065 | 120 | 4 |
| 0102 | 211 | 2065 | 240 | 8 |
| 0103 | 211 | 2065 | 0 | 12 |
| 0201 | -2801 | -1162 | 60 | 16 |
| 0202 | -2801 | -1162 | 180 | 20 |
| 0203 | -2801 | -1162 | 300 | 24 |
| 0301 | -149 | -3455 | 90 | 112 |
| 0302 | -149 | -3455 | 210 | 116 |
| 0303 | -149 | -3455 | 330 | 120 |
| 0401 | 1198 | -1817 | 0 | 184 |
| 0402 | 1198 | -1817 | 120 | 188 |
| 0403 | 1198 | -1817 | 240 | 192 |
| 0501 | 0 | 0 | 90 | 316 |
| 0502 | 0 | 0 | 210 | 320 |
| 0503 | 0 | 0 | 330 | 324 |
| 0601 | 3354 | 1358 | 30 | 340 |
| 0602 | 3354 | 1358 | 150 | 344 |
| 0603 | 3354 | 1358 | 270 | 348 |
| 0701 | 3770 | -1009 | 120 | 304 |
| 0702 | 3770 | -1009 | 240 | 308 |
| 0703 | 3770 | -1009 | 0 | 312 |
| 0801 | 3844 | -3881 | 90 | 100 |
| 0802 | 3844 | -3881 | 210 | 104 |
| 0803 | 3844 | -3881 | 330 | 108 |
| 0901 | -3377 | 1281 | 90 | 256 |
| 0902 | -3377 | 1281 | 210 | 260 |
| 0903 | -3377 | 1281 | 330 | 264 |
| 1001 | -1250 | 1449 | 120 | 436 |
| 1002 | -1250 | 1449 | 240 | 440 |
| 1003 | -1250 | 1449 | 0 | 444 |
| 1101 | 1749 | -364 | 30 | 496 |
| 1102 | 1749 | -364 | 150 | 500 |
| 1103 | 1749 | -364 | 270 | 504 |
| 1201 | 3883 | 3538 | 120 | 232 |
| 1202 | 3883 | 3538 | 240 | 236 |
| 1203 | 3883 | 3538 | 0 | 240 |
| 1301 | -1987 | -3437 | 120 | 328 |
| 1302 | -1987 | -3437 | 240 | 332 |
| 1303 | -1987 | -3437 | 0 | 336 |

FIG. 7

| IDENTIFICATION No. | ANTENNA LOCATION | | ANTENNA BEARING (°) | IDENTIFICATION No. OF TRANSMITTING CODE |
|---|---|---|---|---|
| | X(m) | Y(m) | | |
| 0501 | 0 | 0 | 90 | 316 |
| 0502 | 0 | 0 | 210 | 320 |
| 0503 | 0 | 0 | 330 | 324 |
| 1103 | 1749 | -364 | 270 | 504 |
| 1101 | 1749 | -364 | 30 | 496 |
| 1102 | 1749 | -364 | 150 | 500 |
| 1001 | -1250 | 1449 | 120 | 436 |
| 1002 | -1250 | 1449 | 240 | 440 |
| 1003 | -1250 | 1449 | 0 | 444 |
| 0102 | 211 | 2065 | 240 | 8 |
| 0101 | 211 | 2065 | 120 | 4 |
| 0103 | 211 | 2065 | 0 | 12 |
| 0401 | 1198 | -1817 | 0 | 184 |
| 0403 | 1198 | -1817 | 240 | 192 |
| 0402 | 1198 | -1817 | 120 | 188 |
| 0201 | -2801 | -1162 | 60 | 16 |
| 0202 | -2801 | -1162 | 180 | 20 |
| 0203 | -2801 | -1162 | 300 | 24 |
| 0303 | -149 | -3455 | 330 | 120 |
| 0301 | -149 | -3455 | 90 | 112 |
| 0302 | -149 | -3455 | 210 | 116 |
| 0901 | -3377 | 1281 | 90 | 256 |
| 0902 | -3377 | 1281 | 210 | 260 |
| 0903 | -3377 | 1281 | 330 | 264 |
| 0603 | 3354 | 1358 | 270 | 348 |
| 0602 | 3354 | 1358 | 150 | 344 |
| 0601 | 3354 | 1358 | 30 | 340 |
| 0702 | 3770 | -1009 | 240 | 308 |
| 0703 | 3770 | -1009 | 0 | 312 |
| 0701 | 3770 | -1009 | 120 | 304 |
| 1303 | -1987 | -3437 | 0 | 336 |
| 1301 | -1987 | -3437 | 120 | 328 |
| 1302 | -1987 | -3437 | 240 | 332 |
| 1202 | 3883 | 3538 | 240 | 236 |
| 1201 | 3883 | 3538 | 120 | 232 |
| 1203 | 3883 | 3538 | 0 | 240 |
| 0803 | 3844 | -3881 | 330 | 108 |
| 0802 | 3844 | -3881 | 210 | 104 |
| 0801 | 3844 | -3881 | 90 | 100 |

FIG. 8

| IDENTIFICATION No. | ANTENNA LOCATION | | ANTENNA BEARING (°) | IDENTIFICATION No. OF TRANSMITTING CODE |
|---|---|---|---|---|
| | X(m) | Y(m) | | |
| 0501 | 0 | 0 | 90 | 316 |
| 0502 | 0 | 0 | 210 | 320 |
| 0503 | 0 | 0 | 330 | 324 |
| 1103 | 1749 | -364 | 270 | 504 |
| 1101 | 1749 | -364 | 30 | 496 |
| 1102 | 1749 | -364 | 150 | 500 |
| 1001 | -1250 | 1449 | 120 | 436 |
| 1002 | -1250 | 1449 | 240 | 440 |
| 1003 | -1250 | 1449 | 0 | 444 |
| 0102 | 211 | 2065 | 240 | 8 |
| 0101 | 211 | 2065 | 120 | 4 |
| 0401 | 1198 | -1817 | 0 | 184 |
| 0403 | 1198 | -1817 | 240 | 192 |
| 0201 | -2801 | -1162 | 60 | 16 |
| 0202 | -2801 | -1162 | 180 | 20 |
| 0303 | -149 | -3455 | 330 | 120 |
| 0301 | -149 | -3455 | 90 | 112 |
| 0901 | -3377 | 1281 | 90 | 256 |
| 0902 | -3377 | 1281 | 210 | 260 |
| 0603 | 3354 | 1358 | 270 | 348 |
| 0702 | 3770 | -1009 | 240 | 308 |
| 1303 | -1987 | -3437 | 0 | 336 |
| 1202 | 3883 | 3538 | 240 | 236 |
| 0803 | 3844 | -3881 | 330 | 108 |

FIG. 11

| CHARACTERISTICS OF TRANSMITTING END | CHARACTERISTICS OF BASE STATIONS | AS SHOWN IN FIG. 6. |
|---|---|---|
| | TRANSMITTING POWER | PILOT CHANNEL SIGNAL POWER 23 [dBm] OF 30 [dBm] |
| | TRANSMITTING ANTENNA GAIN | WHEN a = 0 (rad) IS SET AS REFERENCE OF ANTENNA BEARING, $10\log\{0.0754a^2 - 0.5432a + 0.9968\}$ [dB] ($0 \leq a < \pi$) $10\log\{0.0754a^2 + 0.5432a + 0.9968\}$ [dB] ($-\pi \leq a < 0$) |
| PROPAGATION LOSS | | $-10\log\{4\pi r^2\}$ [dB] FOR PROPAGATION DISTANCE r |
| CHARACTERISTICS OF RECEIVING END | TERMINAL LOCATION | X=200(m), Y=−200(m) |
| | REFERENCE BASE STATION | BASE STATION IDENTIFIED BY IDENTIFICATION No. 501 |
| | PROCESS GAIN | 54 [dB] |
| | NOISE FACTOR NF | 6 [dB] |
| | THERMAL NOISE kTB | −113 [dBm] |
| | RECEIVING ANTENNA GAIN | 0 [dB] |
| | NUMBER OF CREATABLE DELAY PROFILES | 24 |
| | CONDITION TO DETECT SIGNAL | RATIO BETWEEN SIGNAL POWER TO NOISE AND INTERFERENCE POWER (SNIR) IS 15 [dB] OR MORE |
| | STANDARD DEVIATION OF RANGING ERROR | FOR RATIO BETWEEN SIGNAL POWER TO NOISE AND INTERFERENCE POWER (SNIR) [dB], $\sigma = 159.26 \exp\{-0.1046 \text{SNIR}\}$ [m] (SNIR $\geq$ [15dB]) |

POSITION CALCULATION METHOD AND A MOBILE TERMINAL AND A SERVER THEREFOR

BACKGROUND OF THE INVENTION

The present invention relates to measurement of a position using radio signals, and in particular, to a technique suitable for the position measurement using a cellular base station as a signal source.

For a position measuring technique of a terminal using broadband radio signals, U.S. patent application Ser. No. 09/791,862 filed on Feb. 26, 2001 describes a system using code division multiple access (CDMA) signals.

FIG. 12 shows a concept of the system. A terminal 1201 receives signals (transmitting codes) 1206, 1207, and 1208 respectively sent from base stations 1202, 1203, and 1204 at timing synchronized according to a global positioning system (GPS) 1205 or the like to create delay profiles indicating reception timing of the signals. The terminal 1201 estimates signal propagation distance using the delay profiles and then the terminal position according to positions of known base stations and the signal propagation distance.

FIG. 13 shows an example of the delay profile. The profile is obtained by calculating a correlation between the transmitted signals (codes) and received signals. A point of time (timing) of a high correlation indicates reception timing of the signals. Therefore, the profile is used to estimate propagation time.

Geometrically, if propagation distance can be estimated for each of signals received by a terminal from three base stations at mutually different positions, a position of the terminal can be estimated according to a principle of trilateration. If propagation distance can be estimated for each of four or more base stations, the terminal position can be estimated with higher precision using, for example, a method of least squares.

Therefore, to determine a position of the terminal, it is desirable to create delay profiles of signals or codes transmitted from at least three base stations at mutually different positions. To improve precision of the estimated terminal position, the number of base stations at mutually different positions is desirably increased. However, to create a delay profile for a transmitting or transmission code, a large number of steps and a large amount of memory are required. That is, for the creation of delay profiles, the number of transmitting codes from base stations is limited by size of the circuit to determine the terminal position. The number of transmitting codes is more strictly limited if it is desired to reduce the terminal size and consumption power.

Each of base stations available as signal sources uses directional antennas and hence forms a plurality of cells each of which has a form of a sector and is hence called a sector. Such a configuration of base stations is ordinarily used for, for example, wireless base stations of mobile telephones or cellular phones.

FIG. 14 shows an example of the configuration. A base station 1410 uses directional antennas 1401, 1402, and 1403 to form sectors 1411, 1412, and 1413, respectively. Since mutually different signals (transmitting codes) are transmitted in the respective sectors, the base station has a plurality of signal sources emitting signals in mutually different directions.

SUMMARY OF THE INVENTION

It is therefore an object of the present invention to increase, when creating delay profiles in the calculation of a position of a terminal, the number of base stations as signal sources of signals used to create the delay profiles. Another object of the present invention is to implement such a system by a small-sized circuit. This leads to a problem of selection of transmitting codes for sectors of each base station.

According to one aspect of the present invention, there is provided a wireless position calculation method based on creation of delay profiles of received signals in which according to a position of a base station and an antenna bearing of each antenna forming each sector of the base station, a transmitting code is selected for a sector of the base station to calculate the terminal position.

Specifically, in a position calculation method in which a terminal receives signals sent from a plurality of antennas to calculate a position of the terminal according to the received signals, each antenna as a transmission source of signals for the position calculation is selected according to a location and a bearing of the antenna.

To calculate the terminal position, there exists, for example, a method in which delay profiles of received signals are created to calculate the position of the terminal according to the delay profiles. There also exists a method in which received power of the received signals are measured to calculate the position of the terminal according to values of the received power.

Each base station includes a plurality of antennas ordinarily having mutually different bearings. Therefore, according to another aspect of the present invention, a base station ordinarily regarded as one unit in the terminal position calculation is regarded as a set of antennas or sectors.

FIG. 17 shows an example of the concept described above. A solid square indicates a position of a position calculating terminal. A plurality of circles indicate base stations. Each circle is equally divided into three sections, i.e., sectors. Of the signals (radio waves) sent from the base stations in the comparison example of FIG. 17, those from a reference base station and seven adjacent base stations in the vicinity of the reference base station are used to calculate the terminal position. Seven base stations have 21 sectors, and the signals of the respective sectors can be concurrently processed using 21 circuits.

According to an example of U.S. patent application Ser. No. 10/038,677 filed on Jan. 8, 2002 by the applicant of the present invention, signals of three sectors of each base stations are processed. However, the signals of only one sector are used for the position calculation. In FIG. 17, the circuits process the signals of the empty sectors of the circles, i.e., the base stations. According to the present invention, the signals to be processed by the circuits are selected for each sector. As in the prior art, the signals of 21 sectors are concurrently processed. However, 13 base stations are used as signal sources and hence the position calculation can use a greater number of reference positions as compared with the prior art.

One of various procedures to select antennas or base stations is used according to criteria as below.

(1) A reference position is set to a position of a particular base station (ordinarily, a nearest base station to the position calculating terminal or a base station from which the terminal can receive signals with highest intensity).

(2) Of transmitting codes from a base station apart from the reference by a predetermined distance or farther, a transmitting code emitted from one of the antennas of the base station is selected, the antenna having a bearing most similar to direction to the reference.

(3) Of transmitting codes from a base station apart from the reference by a predetermined distance or less, transmitting codes sent from all antennas of the sectors of the base station are selected.

According to another aspect of the present invention, there is provided a wireless position calculation method of calculating a position of a terminal according to received power of signals from base stations. In the calculation of the position of the terminal according to the received power of signals from the base stations, a frequency channel to receive signals from each of the base stations for the position calculation is selected according to a position of the base station as a signal source and a bearing of the antenna of the base station.

FIG. 18 shows an overall configuration of a position calculation system according to the present invention. A mobile terminal in the left-hand section of FIG. 18 includes a location LSI (Large Scale Integrated circuit) to calculate a position. The terminal processes electric waves from antennas of a plurality of base stations. The base stations are connected via a network to a location center including a position determination server. The location center may include a server to manage billing and authentication. The location center may be connected to an ASP (Application Service Provider) providing another application service.

The mobile terminal may be a terminal including an antenna which receives signals sent from a plurality of antennas to produce received signals, an RF module which receives the received signals and which conducts conversion of high-frequency signals and baseband signals, an AD converter to convert analog signals produced by the RF module into digital signals, a despreading unit which conducts despreading to obtain a pilot signal from the digital signals, a correlation unit to create a plurality of delay profiles using timing of the pilot signal obtained from the despreading unit, and a control unit to select, according to bearings of the antennas and coordinates thereof, signals to create the delay profiles.

The position determination server may be a server used in a position calculation system in which signals sent from a plurality of antennas are received by a terminal to calculate a position of the terminal according to the received signals. The server includes a storage to accumulate a table to store data regarding coordinates, directivity, and transmitting codes of the antennas, a central processing unit (CPU) to extract antennas satisfying a predetermined condition from a base station information table, and a communication unit to sends data regarding the selected antennas via a network to the terminal.

The storage to store an antenna or base station data table and selection unit to select, from the data table, antennas or base stations satisfying a desired condition need only be included in the terminal or the server. As shown in FIG. 18, only if these components are connected via a network and data is transferred at a sufficiently high speed, the advantageous effect of the present invention can be obtained regardless of whether these components are substantially included in the terminal or the server.

Other objects, features and advantages of the invention will become apparent from the following description of the embodiments of the invention taken in conjunction with the accompany drawings.

BRIEF DESCRIPTION OF THE DRAWINGS

FIG. 6 is a table showing an application example of a base station information table applied to a system conforming to TIA/EIA-95 according to the present invention;

FIG. 7 is a table showing an example of a table obtained when steps 220 and 230 are processed for a base station information table shown in FIG. 6;

FIG. 8 is a table showing an example of a table obtained when steps 241, 342, and 343 are processed for a base station information table shown in FIG. 7;

FIG. 11 is a list showing simulation conditions used to explain effect of the present invention;

DESCRIPTION OF THE EMBODIMENTS

Figure 1:
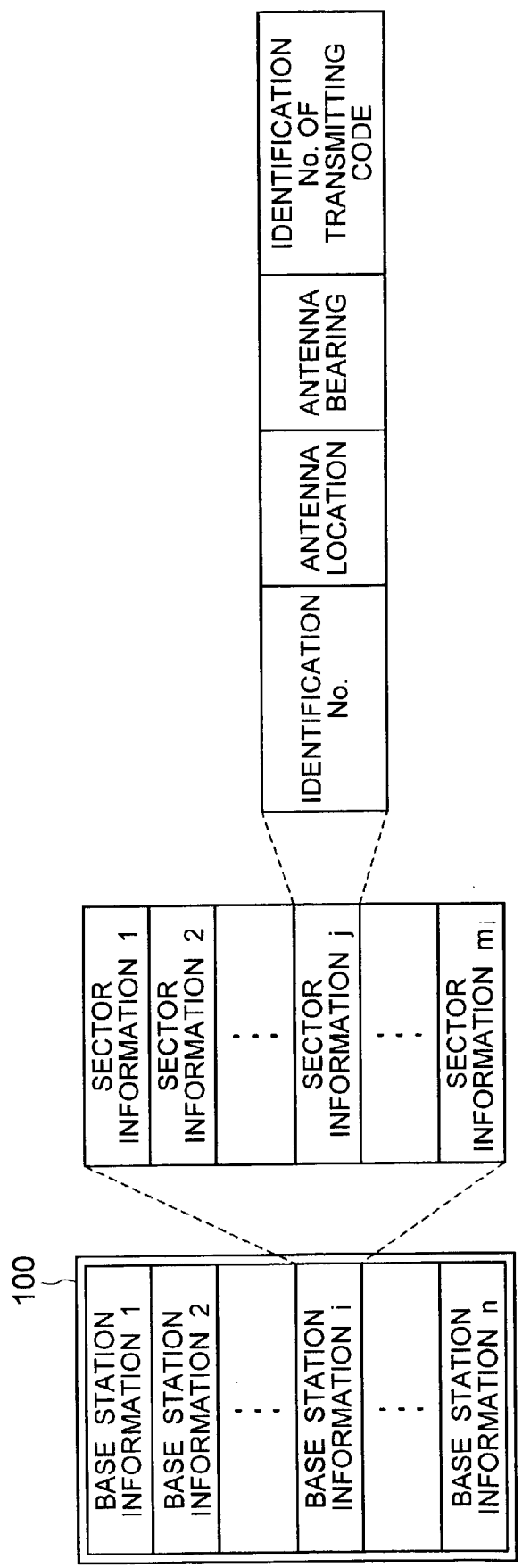
FIG. 1 is a diagram showing a layout of an embodiment of a base station information table according to the present invention.

According to the present invention, the wireless position calculation method based on the creation of delay profiles of received signals selects, according to a bearing of each antenna of each base station forming each sector, a transmitting code for the sector of the base station for the creation of delay profiles. Description will now be given of a specific example of the present invention by referring to the drawings.

An embodiment of a base station information table of the present invention will be described by referring to FIG. 1. The table includes a plurality of base station information items 1 to n. Each information includes at least one sector information. The sector information includes an identification number, an antenna location to form a sector, an antenna bearing, and an identification number of transmitting code to identify a transmitting code sent from the antenna.

In general, a base station is a radio wave source, primarily, a ground station installed to provide a service of mobile communication. One base station often has a plurality of antennas depending on cases. In such a case, these antennas face to mutually different directions, and each antenna forms a sector. Strictly, coordinates indicating a location of the base station and coordinates indicating locations of the antennas of the base station are mutually different from each other. For example, the antennas are ordinarily apart from each other about several centimeters (cm) to about several meters (m). Mutually different coordinates may be set to the base station and the antennas thereof in the data of the table as in the following embodiment. Or, equal coordinates may be set to the base station and the antennas thereof. In this case, although a position calculation error increases, the table can be reduced in size. The antennas belonging to one base station usually share part of a circuit of the base station. Particularly, the antennas ordinarily share a circuit to create timing signals to control operation of the base station.

Figure 2:
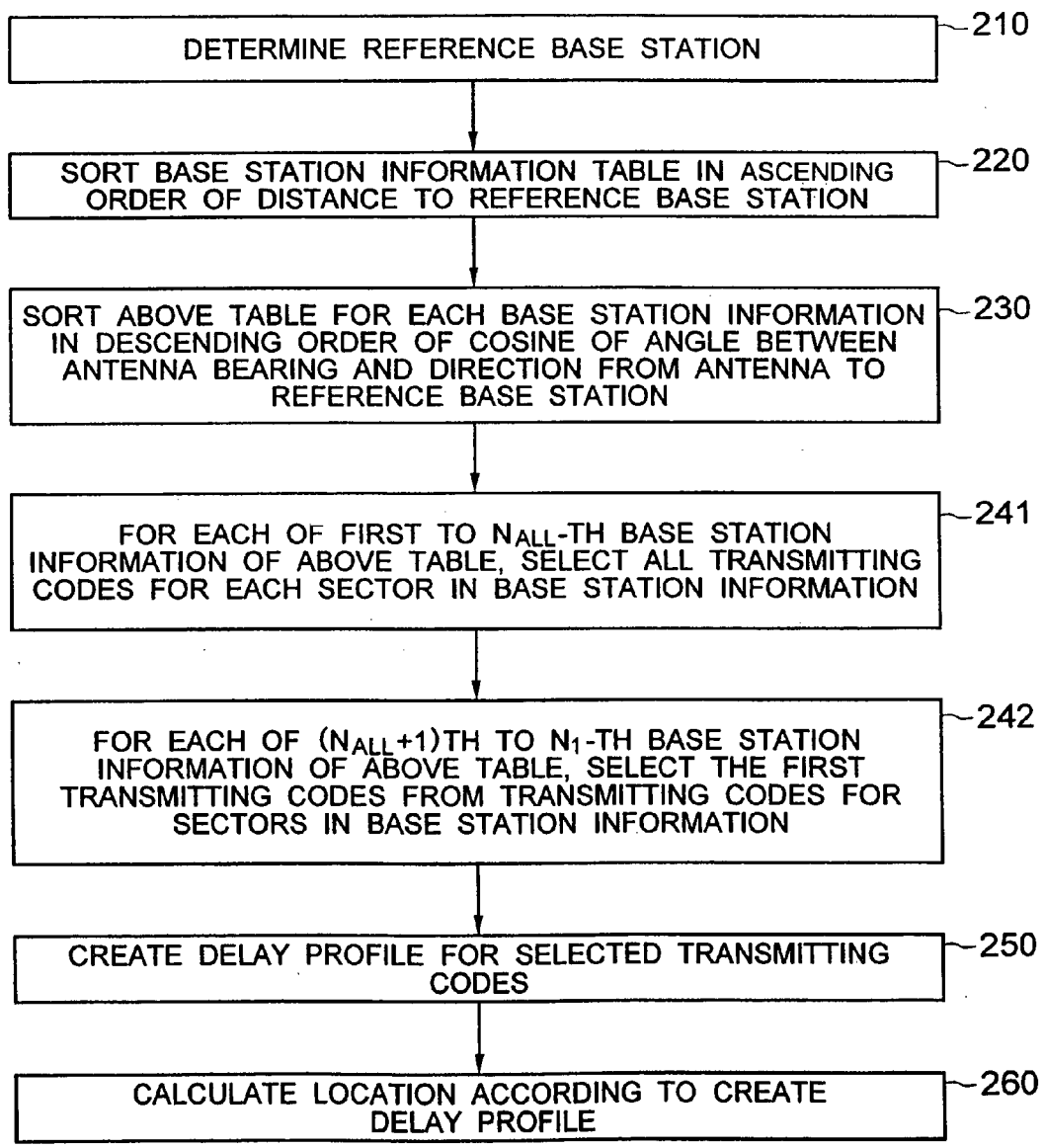
FIG. 2 is a flowchart showing an embodiment of a wireless position calculation method according to the present invention.

Referring next to FIGS. 1 and 2, description will be given of a wireless position calculation method of the present invention. In FIG. 2, step 210 is a step of determining a reference. In step 210, the terminal makes a search through the base stations to synchronize with a base station as a signal source of a transmitting code received with highest received power. The terminal sets the base station as the reference base station. In a cellular system, each base station ordinarily broadcasts control information including an identification number of a sector. Therefore, the terminal can uniquely determine the base station as a signal source with which the terminal synchronizes.

Step 220 sorts the base station information table for each base station information in an ascending order of distance relative to the reference base station. In the sorting, the location of the reference base station is set as an antenna location described in the sector information of the table identified by the identification information. The location of each base station may be set as a location obtained as a mean value of the antenna locations of the sector information in the base station information. Or, the location may be set to a particular antenna location in the sector information selected from the base station information.

Step 230 sorts the table for each base station information in a descending order of a cosine of an angle between a bearing of each sector information and a direction from the antenna to the reference base station.

Step 241 selects, for each of first to $N_{ALL}$-th base station information of the table, all transmitting codes for each sector in the base station information to create delay profiles. In this step, the antenna location for the selected transmitting code is saved.

Step 242 selects, for each of $(N_{ALL}+1)$-th to $N_1$-th base station information of the table, a first transmitting code from the transmitting codes for the sectors in the base station information to create delay profiles. In this step, the antenna location for the selected transmitting code is saved.

Step 250 creates a delay profile for each of the selected transmitting codes.

Step 260 estimates receiving timing of signals according to each delay profile and calculates the position of the terminal using the antenna location of each signal source saved in steps 241 and 242.

For example, U.S. application Ser. No. 10/180,492 filed on Jun. 27, 2002 describes a circuit configuration to create a delay profile. As shown in FIG. 2, a plurality of received signals are processed by 1 to N circuits operating in parallel to increase the processing speed. In this case, by processing signals for each antenna (sector) selected to calculate the terminal position, distances from an increased number of signal sources can be simultaneously processed. This improves the processing precision and speed at the same time.

Figure 3:
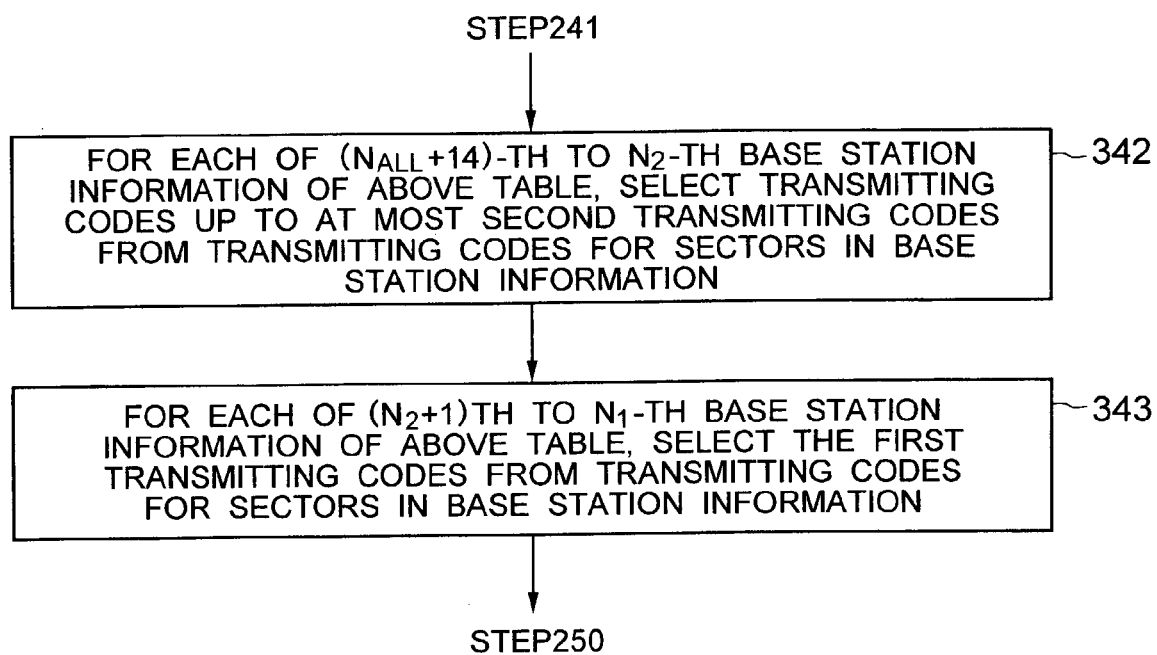
FIG. 3 is a flowchart partly showing a second embodiment of a wireless position calculation method according to the present invention.

Referring to FIG. 3, description will be given of a second embodiment of the wireless position calculation method according to the present invention. FIG. 3 shows steps to be replaced with step 242 of the flowchart shown in FIG. 2. As distinct from the embodiment of FIG. 2, the second embodiment includes step 342.

Step 342 selects, for each of $(N_{ALL}+1)$-th to $N_2$-th base station information of the table stored as above, transmitting codes up to a second transmitting code from the transmitting codes for the sectors in the base station information to create delay profiles. In this step, the antenna location for the selected transmitting code is saved.

Step 343 selects, for each of $(N_2+1)$th to $N_1$-th base station information of the table, a first transmitting code for each sector information from the transmitting codes for the sectors in the base station information to create delay profiles. In this step, the antenna location for the selected transmitting code is saved.

As can be seen from the embodiment, according to the present invention, the number of transmission codes selected from the base station information of one base station is stepwise reduced according to the sequence number assigned to the base station information items in the sorted base station information table.

A third embodiment of the wireless position calculation method of the present invention will be described by referring to FIGS. 4 and 5.

Figure 4:
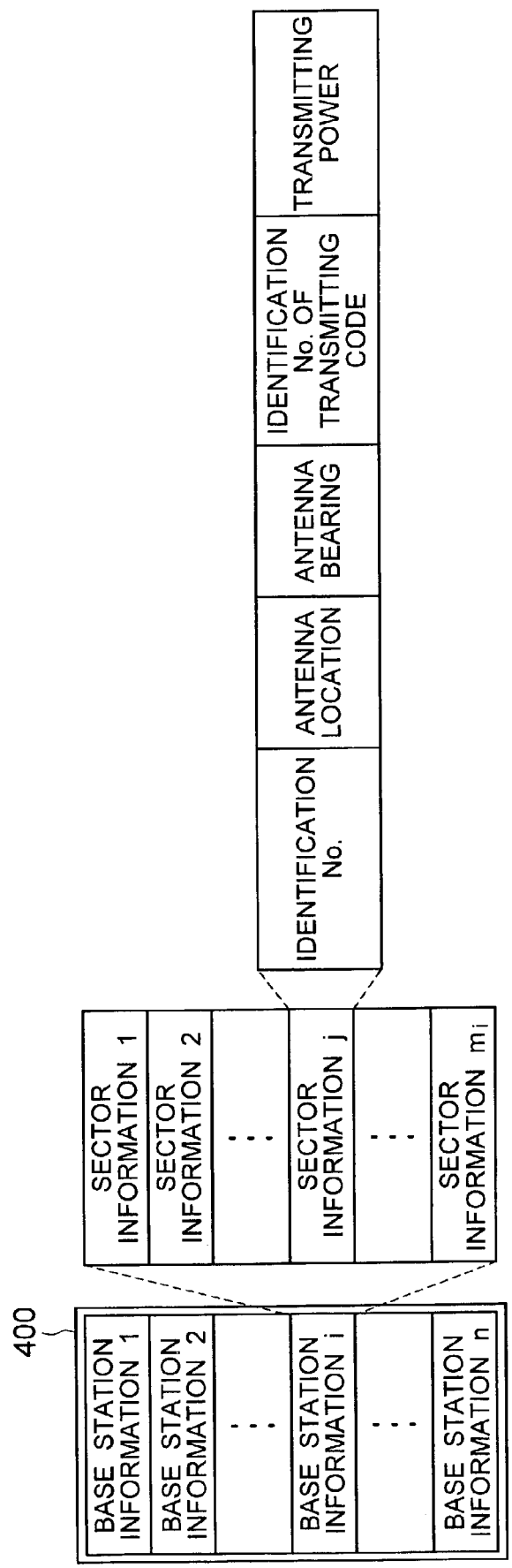
FIG. 4 is a diagram showing a layout of another embodiment of a base station information table according to the present invention.

FIG. 4 shows a layout of a base station information table used in this embodiment. As distinct from the base station information table of FIG. 1, each sector information of the table of this embodiment includes a description item of transmitting power of signals emitted from an associated antenna of each sector.

Figure 5:
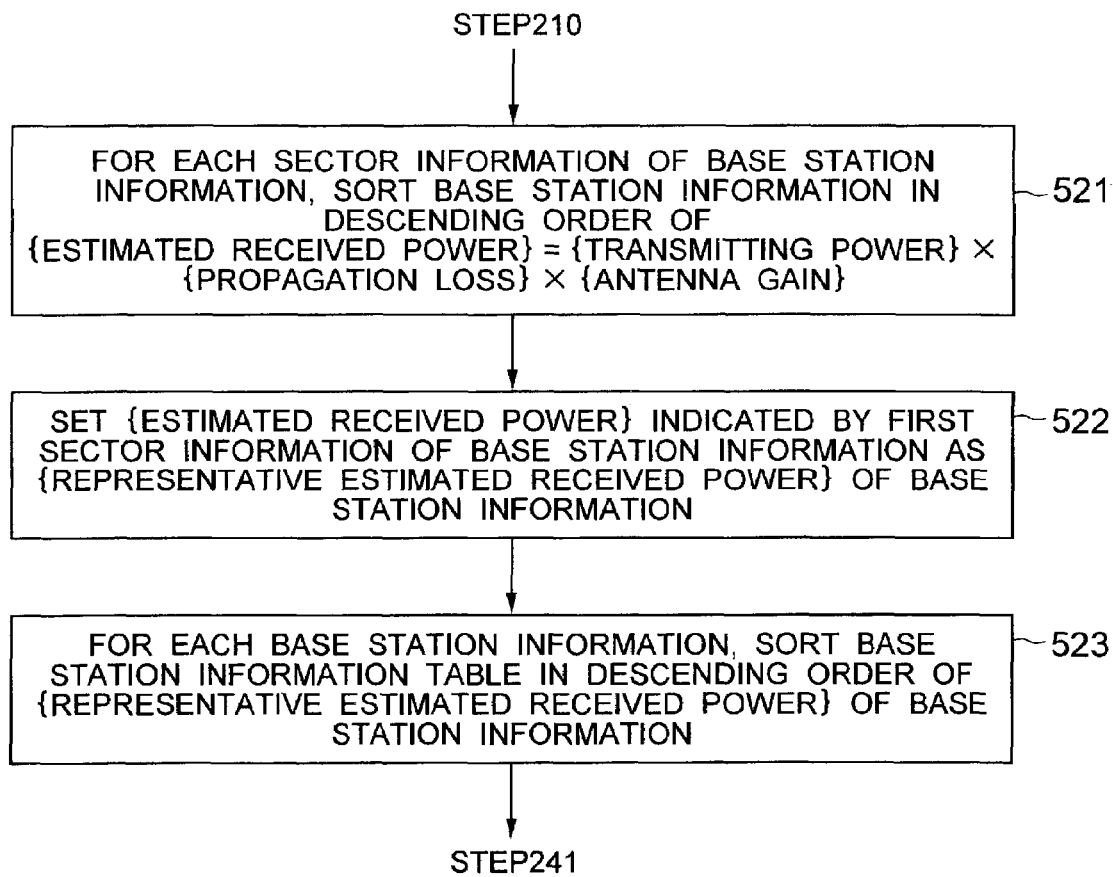
FIG. 5 is a flowchart partly showing a third embodiment of a wireless position calculation method according to the present invention.

FIG. 5 is a flowchart showing part of processing to be replaced with steps 220 and 230 of the flowchart of FIG. 2. As distinct from the embodiment shown in FIG. 2, the embodiment of FIG. 5 includes steps 521 to 523.

Step 521 sorts the base station information table for each sector information. For each sector information, step 521 sorts the base station information in a descending order of estimated received power obtained from each sector information. When signals (a transmission code) emitted from a particular transmitting antenna identified by the sector information is received, the estimated received power is calculated as an estimated value of received power of the signals. The value is obtained by multiplying signal power emitted from the antenna by a propagation loss and an antenna gain associated with an emitting direction of signals. For a calculation example of the propagation loss and the antenna gain, reference is to be made to, for example, items of the propagation loss and the transmitting antenna gain of FIG. 11. For base station information of the reference base station, each estimated received power is calculated using as a reference antenna bearing an antenna bearing identified by the identification information obtained in step 210 without conducting the multiplication of the propagation loss.

Step 522 sets, as a representative estimated received power of each base station information, the estimated received power obtained from the first sector information of the base station information in the base station information table.

Step 523 sorts the table for each base station information in a descending order of the representative estimated received power of each base station information.

The propagation loss is in proportion to at least a square of the distance from the reference base station. Therefore, assuming that the base stations have almost equal transmitting power, the base station information table is sorted in an ascending order of the distance from the reference base station.

Referring now to FIGS. 6 to 8, description will be given of an application example of the second embodiment to a cellular system conforming to TIA/EIA-95.

FIGS. 6 to 8 show the base station information tables by way of illustration. In the tables, three consecutive rows enclosed by bold lines correspond to information of one base station. Each row indicates information of one of the sectors of the base station. An identification number field stores, for example, BASE_ID of TIA/EIA-95. It is also possible to additionally set a parameter value to identify a sector such as SID, NID, BAND_CLASS, or CDMA_FREQ. An antenna location field stores a location of a transmitting antenna to form the sector. The location may be described in the format of, for example, a pair of latitude and longitude or a system of plane rectangular coordinates if the location can be limited to a local domain. The example of FIG. 6 shows a system of plane rectangular coordinates in which antenna locations are indicated by assuming a direction from the west to the east as a positive direction of a y axis and a direction from the south to the north as a positive direction of an x axis. An antenna bearing field stores a bearing of a transmitting antenna to form the sector. The bearing is in the format in which, for example, the positive direction of the y axis is set as a bearing of 0° and a counterclockwise direction is a positive direction of the angle. A field of an identification number of transmitting code stores an identification number, for example, PILOT_PN of TIA/EIA-95 to identify a transmitting code used in the sector.

In step 210, the terminal assumes that a base station identified by an identification number of 0501 is set as a reference base station. FIG. 7 shows the base station information table obtained by executing steps 220 and 230 for the base station information table shown in FIG. 6. Assume that $N_{ALL}=3$, $N_2=8$, and $N_1=13$. FIG. 8 shows results of steps 241, 342, and 343, namely, transmission codes selected to create delay profiles in a selecting order, together with sector information.

Figure 9:
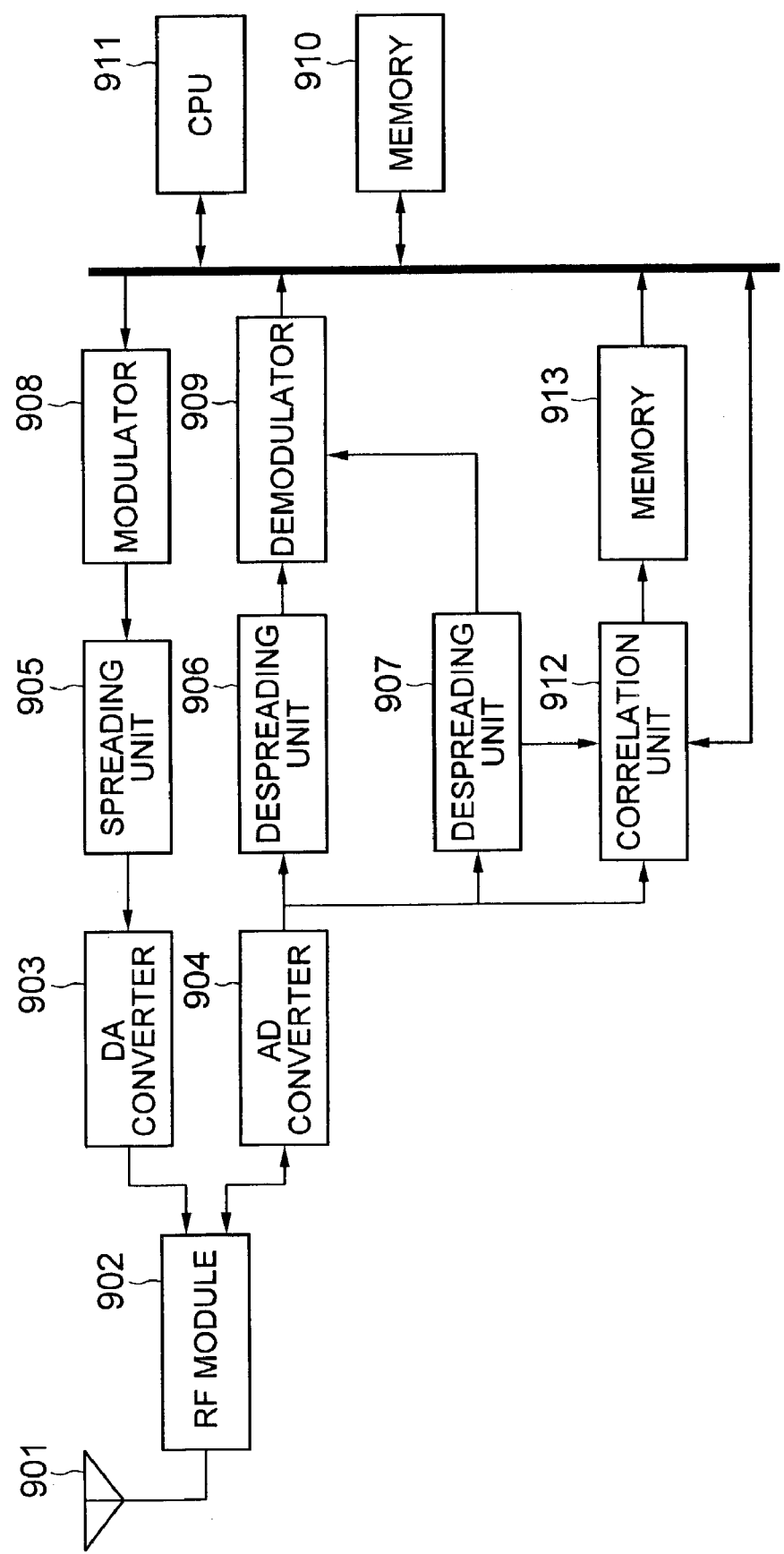
FIG. 9 is a block diagram showing an embodiment of a terminal according to the present invention.

Referring now to FIG. 9, description will be given of an embodiment of a position calculation terminal according to the present invention. The terminal serves also as a terminal of, for example, a cellular phone. In such a case, numerals 901 to 911 indicate constituent components for a CDMA terminal to conduct ordinary communicating operations. The terminal of FIG. 9 includes an antenna 901 to communicate radio waves or signals, an RF module 902 to conduct conversion of high-frequency signals and baseband signals, a DA converter 903 to convert a digital signal into an analog signal, an AD converter 904 to convert an analog signal into a digital signal, a spreading unit 905 to conduct spectrum spreading for a modulated signal, a despreading unit 906 to conduct despreading to extract a control channel signal and a communication channel signal from the digital received signal, a despreading unit 907 to conduct despreading to extract a pilot channel signal from the digital received signal, a modulator 908 to modulate a message, a demodulator 909 to obtain a message on a control or communication channel by referring to the pilot signal, and a memory 910 to store a received message or a message to be transmitted.

Figure 13:
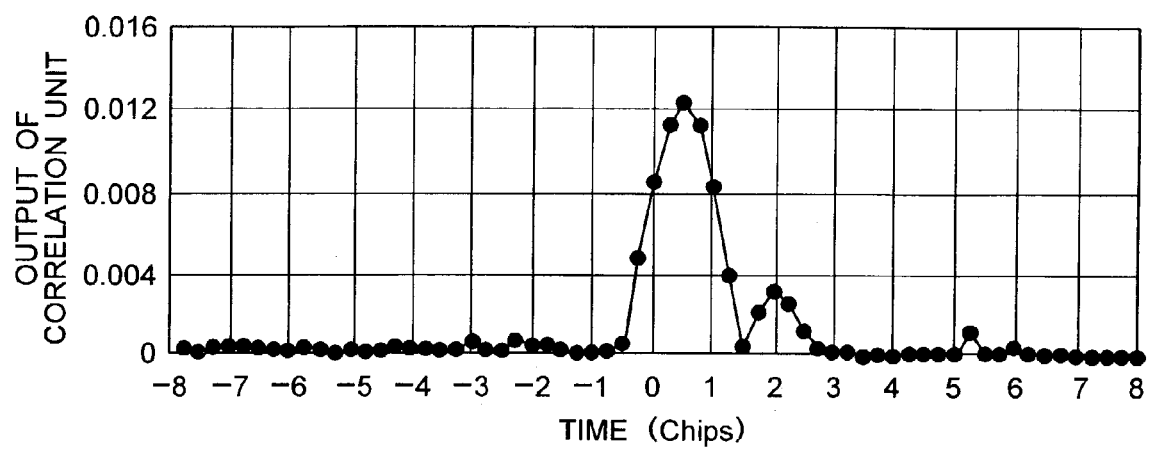
FIG. 13 is a graph showing a waveform as an example of a delay profile.
Figure 14:
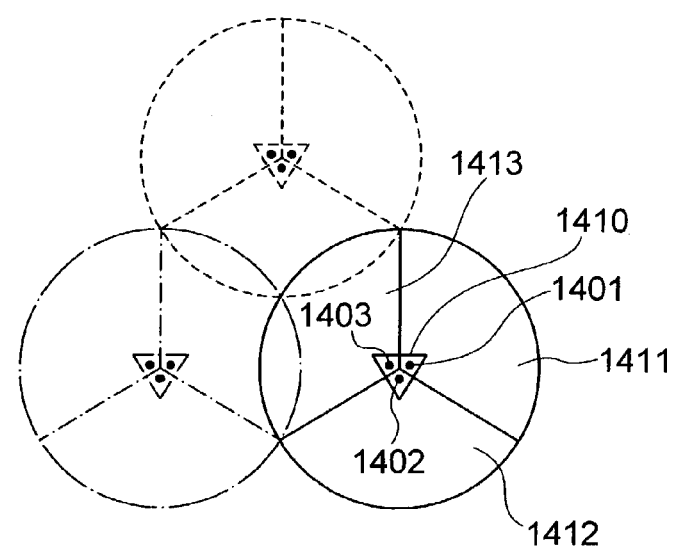
FIG. 14 is a plan view for explaining formation of sectors by directional antennas of base stations.

A CPU 911 controls a call, analyzes a received message, and creates a transmission message. Part of the CPU 911 and blocks 912 and 913 are constituent components for the position calculation. The CPU 911 conducts, in addition to the above processing, control of the correlation unit 912 according to the flow of the wireless position calculation method of the present invention shown in FIG. 2, 3, or 5. The CPU 911 calculates the position of the terminal according to profiles accumulated in the memory 913 and base station information table accumulated in the memory 910. The correlation unit 912 refers to timing of a transmitting code from the despreading unit 907 to create a delay profile for a transmitting code indicated by the CPU 911 and stores the profile in the memory 913. FIG. 13 shows an example of the delay profile. For example, aforementioned U.S. patent application Ser. No. 09/791,862 describes a method of creating a delay profile.

In the wireless position calculation method of the present invention, the step to sort the base station information table and the step to select a transmission code may be processed by a unit outside the terminal. In a typical example, a server connected via a radio channel and a network to the terminal processes the steps. That is, the server outside the terminal may process steps 220, 230, 241, 242, 342, 343, 521, and 523.

Figure 10:
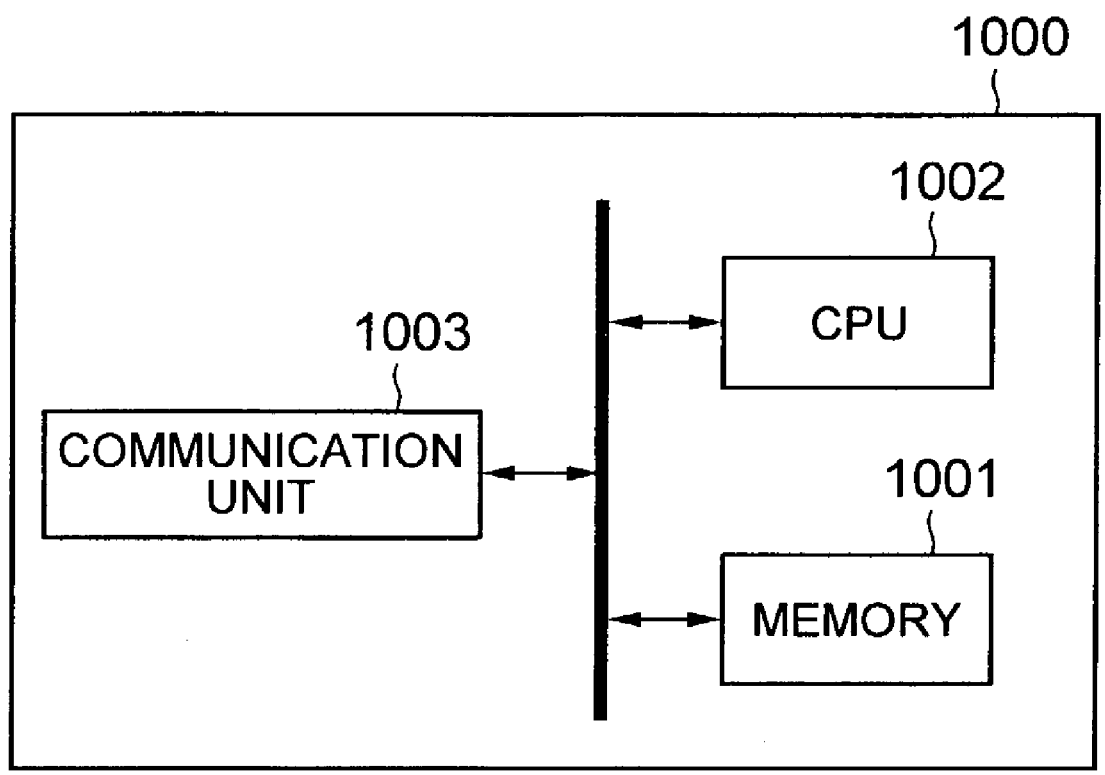
FIG. 10 is a block diagram showing an embodiment of a server according to the present invention.
Figure 12:
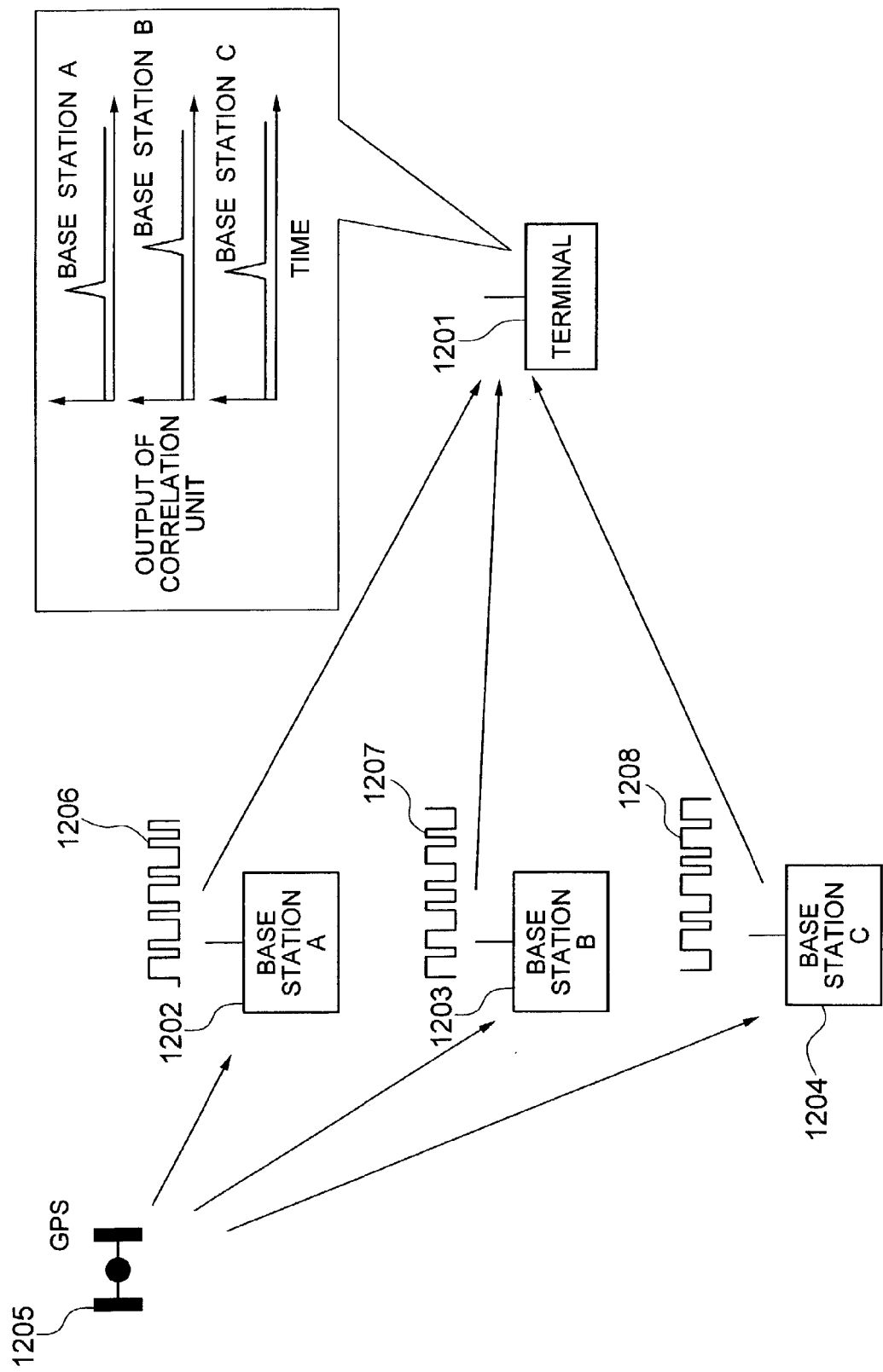
FIG. 12 is a conceptual diagram showing a position calculation technique of a terminal using broadband wireless signals of the prior art.

FIG. 10 shows a configuration of the server. The server 1000 includes a memory 1001 to store base station information table, a CPU 1002 to execute steps to sort the base station information table and steps to select a transmission code, and a communication unit 1003 which receives identification numbers of base stations via a cellular network from the terminal and which sends an identification code of a transmission code selected by the steps to the terminal together with sector information. A personal computer may be used to implement such a server.

Description has been given of an example which measures distance between the terminal and each base station using propagation delay time of signals from the base station to resultantly detect the terminal position. According to another example of the technique, the distance between the terminal and each base stations is measured using intensity of an electric field of signals from the base station to similarly detect the terminal position (for example, see JP-A-9-247737). The present invention is also applicable to the technique. Specifically, the present invention is applied to a position calculation method based on received power of signals from each base station. For example, the present invention can be applied to a position calculation method in which the propagation distance from the base station is estimated not by receiving timing of signals using each delay profile but by the received power using each delay profile. The method determines the terminal position according to the propagation distance from each base station and the position of each base station.

In the position calculation method based on the received power of signals from each base station, the present invention is applicable to further another example. For example, the base station information table of FIG. 16 and the processing flow of FIG. 15 are applied to a cellular system in which base stations use mutually different frequency channels.

Figure 16:
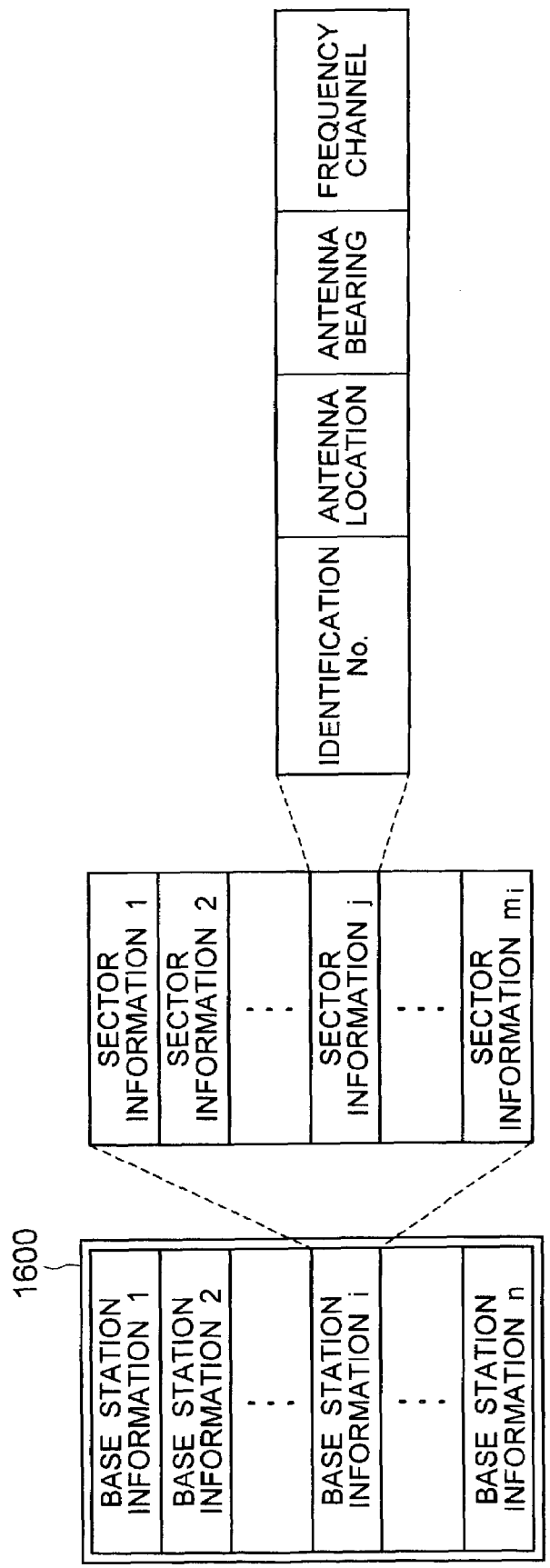
FIG. 16 is a diagram showing a layout of an embodiment of a base station information table in an application example according to the present invention.
Figure 17:
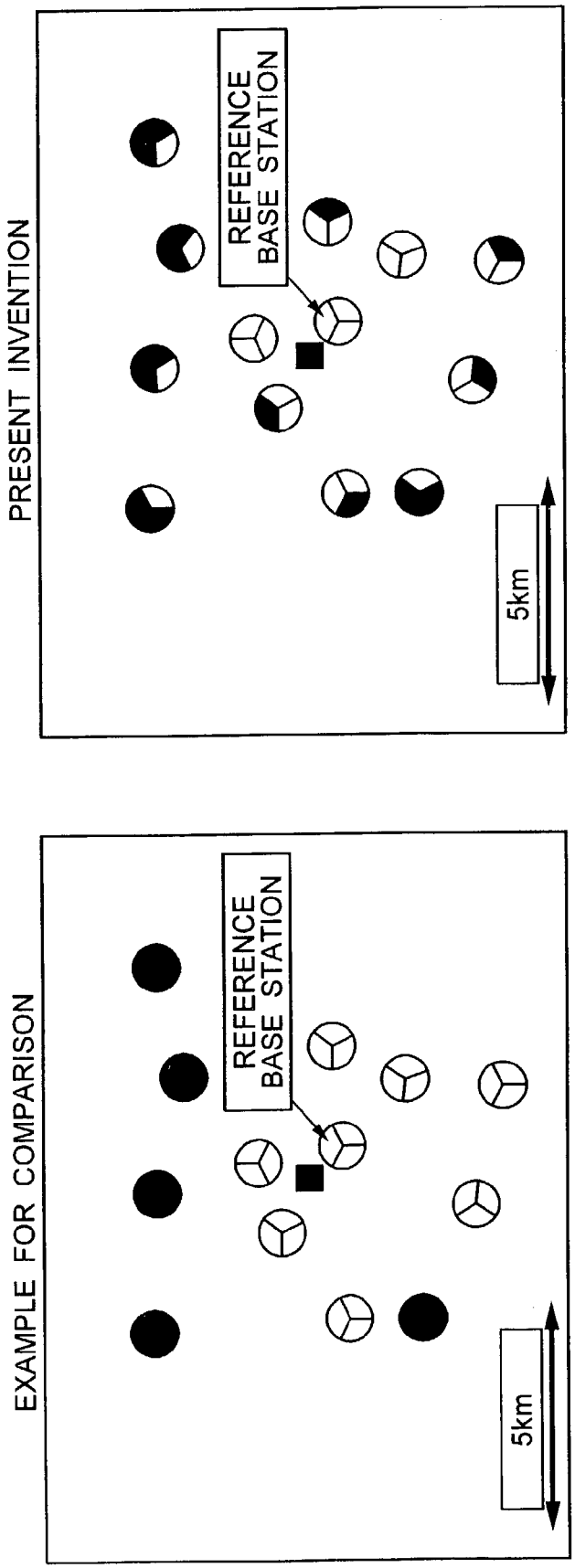
FIG. 17 is a plan view showing a concept of the present invention.
Figure 18:
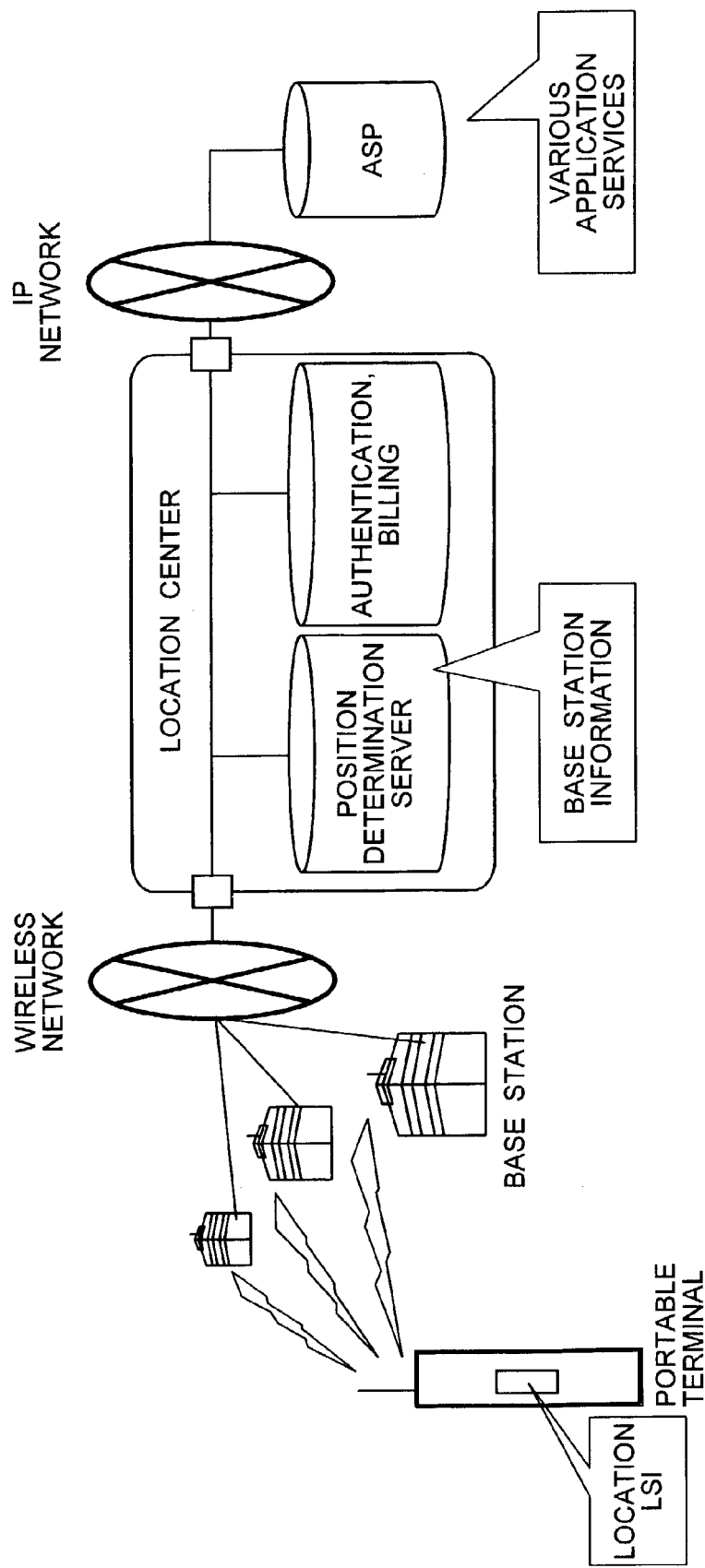
FIG. 18 is a overall configuration diagram of a position calculation system according to the present invention.

When compared with the base station information table of FIG. 16, that shown in FIG. 16 has an aspect that a frequency channel is described for each sector together with sector information of the sector.

Figure 15:
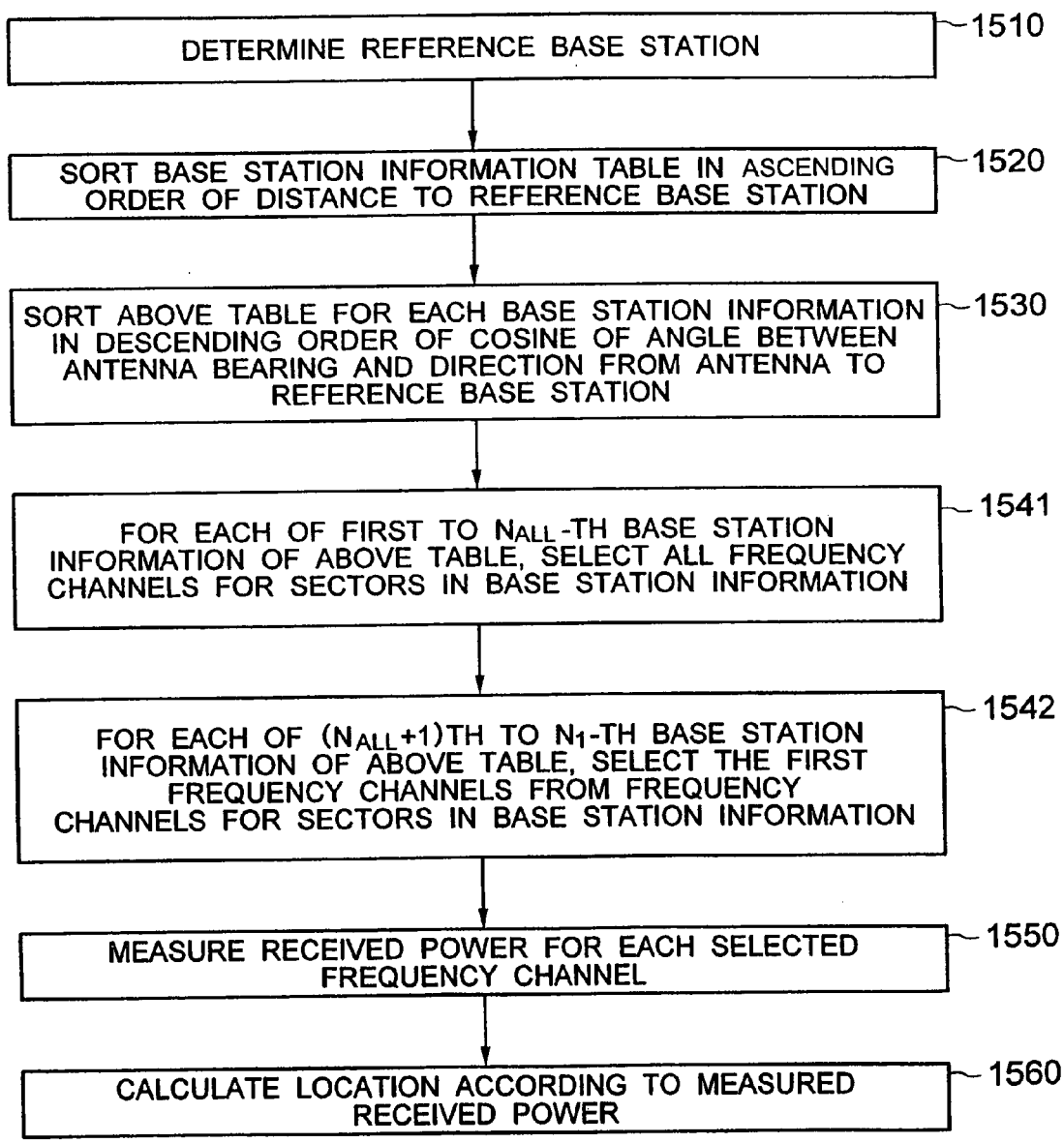
FIG. 15 is a flowchart showing an application example of a wireless position calculation method according to the present invention.

In the flowchart of FIG. 15, step 1510 determines a reference base station. In this step, the terminal makes a search through base stations for a base station with a frequency channel having highest received power and sets the base station as the reference base station.

Step 1520 sorts the table for each base station information in an ascending order of the distance of each base station relative to the reference base station.

Step 1530 sorts the table for each base station information in a descending order of a cosine of an angle between an antenna bearing in each sector information and a direction from the antenna to the reference base station Step 1541 selects, for each of first to $N_{ALL}$-th base station information of the table, all frequency channels for sectors in the base station information to calculate received power. In this step, the antenna location for each selected frequency channel is saved.

Step 1542 selects, for each of $(N_{ALL}+1)$th to $N_1$-th base station information of the table, a first frequency channel for each sector information from frequency channels for sectors in the base station information to calculate received power. In this step, the antenna location for each selected frequency channel is saved.

Step 1550 calculates the received power for each selected frequency channel.

Step 1560 estimates each propagation distance on the basis of the calculated received power to calculate the terminal position using the locations of the antennas as the signal sources saved in steps 1541 and 1542.

According to the present invention, also in a cellular system in which the base stations use mutually different frequency channels, the frequency channels of the base stations available for the position calculation can be efficiently selected.

An advantageous effect of an embodiment the present invention will be described according to simulation. FIG. 11 shows conditions for the simulation. By applying the present invention, 24 kinds of transmission codes are selected to create delay profiles. According to the delay profiles, 18 kinds of transmission codes selected from the transmission codes lead to results satisfying a condition to detect signals. Using the antenna locations of these transmission codes, a horizontal dilution of precision (HDOP) is calculated as 10.27.

In contrast thereto, when 24 kinds of transmission codes to create delay profiles are selected, for example, without using the present invention by selecting the transmission codes simply according to an ascending order of the distance from the reference base station, nine kinds of transmission codes lead to results not satisfying the condition to detect signals. Using antenna locations for the rest of the transmission codes, namely, 15 kinds of transmission codes, the value of HDOP is calculated as 11.47. This is deteriorated when compared with the result obtained by the present invention.

According to the present invention, since transmission codes to create delay profiles are selected in consideration of the antenna bearing, signals can be efficiently detected even when signal sources of the transmission codes are apart from the terminal. This increases the number of base stations which are available for the position calculation and are at mutually different positions. Therefore, even if the number of delay profiles thus created is restricted, precision of the position calculation can be effectively improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of calculating a position of a terminal, comprising the steps of:
   receiving, by the terminal, signals transmitted from a plurality of antennas;
   selecting, according to locations and bearings of the antennas with respect to a position of a reference base station, antennas as transmitting sources of signals to calculate the position; and
   calculating a position of the terminal according to the signals from said selected antennas and received by the terminal.

2. The method of calculating a position of a terminal according to claim 1, further comprising the steps of:
   creating delay profiles of the received signals; and
   calculating a position of the terminal according to the delay profiles,
   wherein said step of creating delay profiles includes the step of selecting antennas as transmitting sources of signals to create the delay profiles, according to at least locations and bearings of the antennas.

3. The method of calculating a position of a terminal according to claim 1, further comprising the steps of:
   measuring received power of the received signals; and
   calculating a position of the terminal according to values of the received power,
   wherein said step of measuring received power includes the step of selecting antennas as transmitting sources of signals to measure the received signals.

4. A terminal, comprising:
   an antenna for receiving signals sent from a plurality of antennas and for producing received signals;
   an RF module for receiving the received signals as an input thereto and conduct conversion of high-frequency signals and a baseband signal;
   an AD converter for converting an analog signal produced by the RF module into a digital signal;
   a despreading unit for extracting a pilot signal from the digital signal;
   a correlation unit for creating a plurality of delay profiles using timing of the pilot signal obtained from the despreading unit; and
   a control unit for selecting signals to create the delay profiles, according to bearings of the antennas with respect to a position of a reference base station and coordinates of the antennas.

5. The terminal according to claim 4, further comprising a calculation unit for calculating a position of the terminal according to the delay profiles.

6. The terminal according to claim 4, further comprising a table for storing an identification number, a location, a bearing, and an identification number of a transmission code of each of the antennas.

7. A server in a position calculation system in which a terminal receives signals sent from a plurality of antennas and a position of the terminal is calculated according to the received signals, said server comprising:

a storage for accumulating a base station information table, the table storing data regarding coordinates, directivity, and transmission codes of the antennas;

a CPU for extracting a selected antenna satisfying a predetermined condition from the base station information table, the selected antenna being extracted from the base station information table according to a location and a bearing of the antennas with respect to a position of a reference base station; and a communication unit for transmitting data regarding the selected antenna, via a network to the terminal.

8. The server according to claim 7, wherein the selected antenna is extracted from the base station information table according to a location and a bearing thereof.

* * * * *